Patented Oct. 16, 1951

2,571,089

UNITED STATES PATENT OFFICE 2,571,089

PRODUCTS OF CERTAIN DIBASIC ACIDS AND ACETONE - FORMALDEHYDE REACTION PRODUCTS

Mortimer T. Harvey, South Orange, and Peter L. Rosamilia, Bloomfield, N. J., assignors to Harvel Research Corporation, a corporation of New Jersey No Drawing. Application May 11, 1949, Serial No. 92,748

7 Claims. (Cl. 260—64)

This invention relates to novel compositions of matter and to methods for producing them. In one of its more specific aspects the invention is directed to novel resinous products produced by reacting certain reaction products of acetone and formaldehyde with a certain proportion of a dibasic acid selected from the group consisting of maleic, fumaric, diglycollic, succinic, adipic and sebacic acids, and also to novel methods for producing said resins.

The reaction products of acetone and formaldehyde which are employed in the practice of this invention are those liquid resinous reaction products thereof produced under alkaline conditions and in which 2–4 moles of formaldehyde have reacted with 1 mole of acetone. A generally illustrative method for the production of these acetone-formaldehyde reaction products is to mix acetone and an aqueous solution of formaldehyde in any desired concentration, or its equivalent which may be a polymer thereof, such as paraformaldehyde, etc. The mole ratio of acetone to formaldehyde is preferably in the range of 1–2 to 1–4. However, the mole ratio of acetone to formaldehyde may be as high as 1–1 or higher because even with such a mole ratio, there are produced resinous reaction products in which at least 2 moles of formaldehyde have reacted with 1 mole of acetone and in such cases the unreacted acetone may be recovered. Also, the mole ratio of acetone to formaldehyde may be much lower than 1–4 and in this case also the resinous reaction products are produced and in which 2–4 moles of the formaldehyde have reacted with 1 mole of acetone. After the mixture is made three is added thereto a small amount of an alkaline agent, preferably in aqueous solution. The alkaline agents which are preferably employed are lime, sodium or potassium hydroxide or carbonate. The aqueous solution of alkaline agent is generally added to the mixture in part by part in order to prevent the reaction mass from going to the solid state and so that the resinous reaction mass is at least 95% liquid containing no more than 5% solids, and by weight being at least as great as the amount of acetone which has reacted. The resultant mass after said reaction takes place may be a clear solution or a slightly cloudy solution. Thus the various resultant masses contain liquid resinous reaction products which are water soluble by weight to the extent of 100%–80% and which are water dispersible to the extent of approximately 100% and may contain 0–5 parts of a solid resinous product for each 100 parts of the liquid resinous products.

These liquid acetone-formaldehyde resinous reaction products may be reacted under either aqueous or anhydrous conditions with one or more of said dibasic acids in the ratio by weight of 100 parts of the former to 10 to 50 parts of the latter. This reaction is generally carried out at a temperature of 250–350° F. to produce a thermosetting resin, that is, a resin which is in its intermediate state and is capable by heat alone of being converted to the infusible state.

In factory practice, to the entire aqueous acetone-formaldehyde reaction mass, which may have been freed of any excess unreacted acetone which is recovered, is now added the required amount of the dibasic acid and this mix is now heated at a temperature of 250–400° F. and maintained in this temperature range until solution takes place. By continued heating in said temperature range, the desired viscosity, varying from a liquid to a solid thermosetting resinous reaction product is produced. In its first stage, the thermosetting resinous reaction product is a liquid. The heating may be terminated at this time and the mass may be dehydrated at a low temperature and under vacuum to provide a dehydrated thermosetting liquid resin which may be spread either with or without the aid of a solvent on a suitable base and then converted to the solid infusible state by heat to provide a dense, hard, tough coating or impregnant having good tensile strength and useful in the arts as a binder. These liquid thermosetting resins are commercially soluble in mixtures of ketones and alcohols and also in phenol-formaldehyde and urea-formaldehyde resins. They are particularly suitable as binders for friction elements, such as brake linings and clutch facings and for grinding elements such as sand paper, emery cloth, grinding wheels, etc. to bind the abrasive particles to each other and/or to the base.

These novel resins either before or after dehydration and preferably after dehydration may be converted to the second stage, namely a solid, which may be pulverized and is a fusible resin and may be converted to the ultimate or infusible state by heat alone and generally between 250–500° F. These fusible resins having fusing points above 40° C. and acid numbers of less than 100 find utility as binders and especially in the field of abrasive or grinding wheels for binding the abrasive particles to each other. This may be accomplished by mixing the abrasive particles with the powdered fusible resin in the proportions of 10–15 parts of the latter to 90–85 parts of the former and then maintaining the mixture in the temperature range of 190–350° F. for a period of 16–48 hours, progressing the temperature upward.

The following examples are given merely to illustrate specific manners for obtaining my novel resinous reaction products and are given merely by way of illustration and not limitation, all parts being given by weight unless otherwise specified.

*Example 1*

Employing a closed steel kettle with a scraper-agitator and reflux condenser, there is added while the scraping stirrer is in motion, 30 lbs. of acetone and 85 lbs. of an aqueous solution of formaldehyde (37% conc.). In a separate container there is prepared an aqueous solution of .9 lb. sodium hydroxide in 3 lbs. water. One-quarter of said alkaline solution is added to the agitated acetone-formaldehyde mixture. Then steam is applied to the jacket of the reaction vessel for a short period of time whereupon a reaction starts. The steam is cut off when the temperature reaches approximately 135° F. and cold water is passed into said jacket to maintain the temperature of the reaction at a value no greater than about 160° F. The temperature of the reaction, after it reaches 160° F. is reduced to about 140° F. by continuing the cold water through the jacket. Then the second one-quarter of aqueous solution of alkali is added and if the temperature does not rise above 140° F. a small amount of heat is again applied and the temperature of the mass is controlled at between 165–170° F. The same procedure is followed in adding the last two one-quarters of the aqueous alkaline solution. After each of these additions, the mass is held at these elevated temperatures of 135–190° F. until they are neutral and the time required is generally 10 to 15 minutes. After the last one-quarter of aqueous alkaline solution has been added and the exothermic reaction has taken place so that the mass is no longer alkaline, it is then heated in the range of 135–190° F. for about 10 minutes to produce an aqueous mass containing a quantity of liquid resinous reaction products whose weight is at least equal to the quantity of reacted acetone, and in this case measured about 40 lbs. and is dissolved substantially completely in the water component. The quantity of free formaldehyde at the end of this period was approximately 3%, thus high yields were obtained. Then to this mass there is added 10 lbs. of adipic or maleic acid, also with constant stirring. The resultant mass, under continuous agitation, is heated to a temperature of approximately 210° F. for about 10 minutes and then it is dehydrated at 250° F. under vacuum of 2″–3″ to provide a substantially dehydrated heavy, clear, viscous liquid. This viscous liquid is a thermosetting resin which may be heated for a limited period of time at 280° F. to convert it from the liquid to a dry, solid state. This dry solid, which is a fusible thermosetting resin, may be pulverized to a fine powder which in turn may be heat converted to the substantially infusible state by heat alone and generally, in factory practice, at a temperature between 265–500° F. This resin serves as an excellent binder for abrasive elements such as sand paper, emery cloth and abrasive wheels. The powdered fusible resin may be mixed with the abrasive particles and open cured generally at a temperature of 300–500° F. to provide a dense, compact and tough abrasive wheel.

*Example 2*

Following the same procedure as that set forth in Example 1 and employing 30 parts by weight of acetone and 170 parts of an aqueous solution of formaldehyde (37% conc.) and 1 part of sodium hydroxide in 3 parts of water except that in this instance the mass in the last step was heated for a longer period of time, namely 15–20 minutes at a temperature of 130–190° F., the resultant aqueous mass contained approximately 75 parts of a water soluble acetone-formaldehyde resinous reaction product and approximately 6% of unreacted or free formaldehyde. Then to this aqueous mass there was added 20 parts of adipic or maleic acid. This dibasic acid and resinous acetone-formaldehyde aqueous mass may be treated in the same manner as Example 1 to provide the liquid as well as the solid thermosetting resinous reaction products. The liquid thermosetting resinous reaction product may be diluted with an equal part of water to obtain a solution thereof which may be employed for the coating of glass fibers which in turn may be cured at 350–450° F. for 1–5 minutes to bond the glass fibers together by means of said resin.

*Example 3*

Following exactly the same procedure with the same components and same proportions as those set forth in Example 2, except that a solution of 4 parts of sodium hydroxide in 8 parts of water is used in place of the sodium hydroxide-water solution in said example. In this instance at the end of the acetone-formaldehyde reaction period, the quantity of free formaldehyde was measured and found to be 1.3%.

*Example 4*

Following the same procedure as that set forth in Example 2, except that before the dibasic acid is added, the aqueous acetone-formaldehyde reaction mass is first dehydrated either in the open to 284° F. or under vacuum to 212° F. and 3″ mercury to remove substantially all the water. The resultant dehydrated reaction product is a light colored, viscous resinous mass capable of being cured at 284° F. for 16 hours. To this dehydrated viscous resinous mass is added the 20 parts of adipic or maleic acid and heated at a temperature of approximately 250° F. to first obtain a liquid thermosetting resinous reaction product which upon further heating at the same temperature may be converted to a substantially solid infusible resin.

*Example 5*

Following the same procedure as that set forth in the foregoing examples, and using 30 parts of acetone and 170 parts of formaldehyde (37% conc.), the aqueous solution of sodium hydroxide, consisting of 2 parts of sodium hydroxide and 4 parts of water, is added to the acetone-formaldehyde mixture in three separate portions, allowing the exothermic reaction, which is started with the aid of heat, to subside between each addition of aqueous sodium hydroxide solution. After the third addition of aqueous solution of sodium hydroxide, the mixture is heated for 10–15 minutes at approximately 190° F. Then 20 parts of sebacic acid or adipic acid are added and the mass is substantially dehydrated in an open container up to 284° F. The mixture was further heated to 400° F. and held for a clear amber solution and this product when cooled is almost solid. This liquid solution which is first formed at that temperature, upon further heating at the same temperature causes a reaction to take place. This may be continued for some time and then the mass is cooled to provide a solid, intermediate fusible thermosetting resin. However, the liquid mass, after first heating to solution at 400° F. may be spread hot on metal and cured to a smooth, thin, hard, infusible film at 302° F. in one-half hour. A thicker film cured at 302° F. for one-half hour gives a clear, infusible, amber wrinkled finish.

These substantially solid infusible resinous reaction products of this invention as shown by the various examples are highly resistant to water, acetone, petroleum spirits, aromatic spirits, alkalies and strong acids and also are tough, dense and have a high tensile strength and centrifugal strength. These characteristics make these resins admirably suitable as binding or bonding agents particularly in the field of abrasives and especially as abrasive wheels and sand paper where those characteristics are of salient importance.

In all instances, the various acetone-formaldehyde resinous reaction products are normally liquid and are capable of dissolving said dibasic acids in the proportions of 100 parts of the former to 10-15 and preferably 10-25 parts of the latter. The time and temperature required for solution is dependent upon the particular acetone-formaldehyde reaction product and the dibasic acid employed. However, in all instances, solution may be obtained by heating the combination to 400° F. to obtain normally liquid solutions. All of said solutions may be converted to resinous reaction products in either the liquid or solid state, which products are intermediate or thermosetting resins capable of being heat converted to the infusible state. Said solutions may be converted to the intermediate or thermosetting state by heating at 400° F. These intermediate resins may be converted by heat alone to the infusible state at the same temperature, 400° F.

The various thermosetting resinous reaction products of this invention may be combined with phenol-formaldehyde as well as urea-formaldehyde resins and alkyd resins in proportions of 1-10 to 10-1 depending upon the characteristics desired in the ultimate product and the uses to which they are to be put.

These novel intermediate or thermosetting reaction products either in the liquid or solid fusible condition also find use as binders for brake linings and clutch facings of the woven, impregnated and molded types. For example, 100 parts of asbestos fibers and 25 parts of a normally solid fusible powdered resin of Example 1 are mixed together until there is a uniform distribution of one with respect to the other. Then the mass is cold pressed to the shape and size desired and this preform is then placed in an oven and cured for 24 hours in progressive steps of 200-350° F.

While this invention has been described in detail, it is not to be limited to the exact methods as shown but is subject to various changes and modifications.

We claim:

1. A normally liquid solution capable of being heat converted at 400° F. to the substantially infusible state and comprising 10-50 parts by weight of a dibasic acid selected from the group consisting of maleic, fumaric, diglycollic, succinic, adipic and sebacic acids dissolved in 100 parts by weight of a normally liquid resinous reaction product of acetone and formaldehyde produced under alkaline conditions and in the mole proportions of 1 mole of acetone to 2-4 moles of formaldehyde.

2. A normally liquid solution capable of being heat converted at 400° F. to the substantially infusible state and comprising 10-50 parts by weight of maleic acid dissolved in 100 parts by weight of a normally liquid resinous reaction product of acetone and formaldehyde produced under alkaline conditions and in the mole proportions of 1 mole of acetone to 2-4 moles of formaldehyde.

3. A normally liquid solution capable of being heat converted at 400° F. to the substantially infusible state and comprising 10-50 parts by weight of adipic acid dissolved in 100 parts by weight of a normally liquid resinous reaction product of acetone and formaldehyde produced under alkaline conditions and in the mole proportions of 1 mole of acetone to 2-4 moles of formaldehyde.

4. A normally liquid solution capable of being heat converted at 400° F. to the substantially infusible state and comprising 10-50 parts by weight of diglycollic acid dissolved in 100 parts by weight of a normally liquid resinous reaction product of acetone and formaldehyde produced under alkaline conditions and in the mole proportions of 1 mole of acetone to 2-4 moles of formaldehyde.

5. The method for producing a resin capable of being heat converted to the substantially infusible state comprising heat reacting at a temperature of 250-450° F., 10 to 50 parts by weight of dibasic acid selected from the group consisting of maleic, fumaric, diglycollic, succinic, adipic and sebacic acids with 100 parts of a liquid resinous reaction product of acetone and formaldehyde produced under alkaline conditions and in the mole proportion of 1 mole of acetone to 2-4 moles of formaldehyde.

6. A product made according to claim 5.

7. A substantially infusible resin produced by heat converting a product made according to claim 1.

MORTIMER T. HARVEY.
PETER L. ROSAMILIA.

REFERENCES CITED

The following references are of record in the file of this patent:

UNITED STATES PATENTS

| Number | Name | Date |
|---|---|---|
| 1,614,200 | Kattwinkel | Jan. 11, 1927 |
| 2,191,802 | Novotny | Feb. 27, 1940 |
| 2,319,826 | Pallett | May 25, 1943 |
| 2,328,738 | Nelson | Sept. 7, 1943 |
| 2,401,138 | Coes | May 28, 1946 |
| 2,440,300 | Rushmer et al. | Apr. 27, 1948 |